(12) United States Patent
Hannikainen

(10) Patent No.: US 11,575,633 B2
(45) Date of Patent: Feb. 7, 2023

(54) SPAM DETECTION

(71) Applicant: F-Secure Corporation, Helsinki (FI)

(72) Inventor: Heikki Hannikainen, Helsinki (FI)

(73) Assignee: WithSecure Corporation, Helsinki (FI)

( * ) Notice: Subject to any disclaimer, the term of this patent is extended or adjusted under 35 U.S.C. 154(b) by 0 days.

(21) Appl. No.: 16/789,813

(22) Filed: Feb. 13, 2020

(65) Prior Publication Data

US 2020/0267103 A1 Aug. 20, 2020

(30) Foreign Application Priority Data

Feb. 15, 2019 (GB) .................................. GB1902145

(51) Int. Cl.
| | |
|---|---|
| *G06F 15/16* | (2006.01) |
| *H04L 51/212* | (2022.01) |
| *H04L 43/16* | (2022.01) |
| *H04L 9/40* | (2022.01) |
| *H04L 51/224* | (2022.01) |
| *H04L 67/50* | (2022.01) |

(52) U.S. Cl.
CPC ............ *H04L 51/212* (2022.05); *H04L 43/16* (2013.01); *H04L 51/224* (2022.05); *H04L 63/1425* (2013.01); *H04L 63/1441* (2013.01); *H04L 67/535* (2022.05); *H04L 63/166* (2013.01)

(58) Field of Classification Search
CPC ......... H04L 51/12; H04L 43/16; H04L 51/24; H04L 63/1425; H04L 63/1441; H04L 67/22; H04L 63/166; H04L 43/028; H04L 43/045; H04L 43/0894; H04L 63/0272; H04L 63/1408
See application file for complete search history.

(56) References Cited

U.S. PATENT DOCUMENTS

| | | | |
|---|---|---|---|
| 7,490,128 B1 | 2/2009 | White et al. | |
| 2004/0199592 A1* | 10/2004 | Gould | H04L 51/00 |
| | | | 709/206 |
| 2006/0031359 A1* | 2/2006 | Clegg | H04L 51/12 |
| | | | 709/206 |

(Continued)

FOREIGN PATENT DOCUMENTS

| | | |
|---|---|---|
| EP | 2180660 A1 | 4/2010 |
| WO | 2013189725 A1 | 12/2013 |

OTHER PUBLICATIONS

UK Search Report dated Aug. 15, 2019 in co-pending UK Application No. GB1902145.0.

*Primary Examiner* — John B Walsh
(74) *Attorney, Agent, or Firm* — Thomas | Horstemeyer, LLP (57) ABSTRACT

A method of determining that a client is likely engaged in the sending of spam emails via a network node. The method comprises, at the network node, defining a message size threshold and a message sending rate threshold, detecting the opening of Simple Mail Transfer Protocol, SMTP connections between a client device and an email server, identifying messages sent from the client over the SMTP connections which exceed said message size threshold and counting the identified messages to determine a client email message sending rate. The method further comprises making an assumption that the client is engaged in the sending of spam emails if the client message sending rate exceeds said message sending rate threshold.

21 Claims, 7 Drawing Sheets

(56) References Cited

U.S. PATENT DOCUMENTS

| | | | |
|---|---|---|---|
| 2006/0259551 A1* | 11/2006 | Caldwell | H04L 51/12 |
| | | | 709/204 |
| 2010/0161537 A1 | 6/2010 | Liu et al. | |
| 2011/0197275 A1 | 8/2011 | Chasin et al. | |
| 2017/0006053 A1* | 1/2017 | Greenberg | H04L 67/10 |
| 2019/0230010 A1* | 7/2019 | Guo | H04L 43/04 |

* cited by examiner

SPAM DETECTION

CROSS-REFERENCE TO RELATED APPLICATIONS

The present application claims priority to United Kingdom patent application GB1902145.0 filed on Feb. 15, 2019 entitled "SPAM DETECTION", which is herein incorporated by reference in its entirety.

TECHNICAL FIELD

The invention relates to a method of detecting spam and spamming clients.

BACKGROUND

A consumer VPN service is an Internet access service that can provide privacy and anonymity to its users. Typically a given user will install the VPN client on all of his devices allowing secure and private communication to the public Internet over an untrusted local network, such as a free WiFi network at a public location. VPN traffic passes through a VPN gateway which can be a router, server, firewall or similar device with internetworking and data transmission capabilities, and is configured to pass, block or route VPN traffic. A user device with a VPN client may also access the Internet via the VPN gateway to hide its identity and/or location.

As is the case with Internet Service Provider (ISP) environments, some percentage of VPN user devices may have malware on their systems which may send out spam emails. VPNs with a free trial period may in particular have a considerable percentage of user devices that are intentionally fraudulent and which use the VPN for sending out spam, performing portscans, and otherwise disturbing the peace of the Internet.

When spam emails are sent out, reports of the received spam are forwarded to the current users of the IP addresses used to send the spam. The upstream network provider usually requires the originator to cease the spamming activity in a timely manner.

Spam blocking lists, such as Spamhaus™, may blacklist certain IP addresses, and the network and hosting providers may require spamming issues to be resolved in a way such that the IP address is no longer listed.

VPNs that provide a privacy and anonymity service may not maintain log files of outgoing connections made by the VPN clients. Therefore, when a spam complaint comes in, it is difficult to determine which client sent out the particular spam.

Even in a normal ISP network environment, with or without a VPN being involved, there may be a need to identify a client from which spam is originating. It would be preferable to be able to detect which of these devices is originating the spam, block the individual device from the network and instruct the customer to remove malware from that device.

To reduce spam, a VPN or an ISP can block connections to the normal unsecured SMTP TCP port 25, in line with Best Current Practices (such as FICORA recommendation 312A). Clients can still send emails using the standard SMTP SUBMISSION port, TCP 587 (RFC 4409, BCP 134), or the de-facto TLS-over-SMTP submission port 465 (see RFC 8314 section 7.3). On port 587, the STARTTLS (RFC 3207) mechanism is usually used to upgrade a plaintext SMTP TCP connection to a TLS connection after an initial plaintext handshake. Port 465 implicitly starts with TLS and then proceeds with an SMTP handshake within TLS encryption, much like HTTPS on port 443 does.

All email service providers (e.g. Gmail™ and ISPs providing email services) provide their users with a way to send outbound emails on one or both of these ports (587 and 465) after authenticating themselves (username and password within the TLS encrypted session, or OAuth). Even after such authentication, a lot of spam may still be sent over these ports. On the one hand, a malicious customer may purchase email relay services from mass mailing providers whilst, on the other, malware on a user device may use the customer's cached email credentials to send spam via the customer's ISP using the SUBMISSION port.

In an unsecured environment, one might consider counting emails sent by a given client device and defining some threshold for a given time period (e.g. 100 emails per day) which, if exceeded, is taken as an indication of spam. However, the widespread use of TLS prevents this, as a gateway is unable to distinguish individual emails from within the mass of SMTP message traffic: multiple emails may be sent over a single SMTP connection. Deep inspection of SMTP messages would also be a privacy concern. Whilst an option might be to simply block (all) the submission ports, that would prevent the customer from sending emails.

SUMMARY

According to a first aspect of the invention there is provided a method of determining that a client is likely engaged in the sending of spam emails via a network node. The method comprises, at the network node, defining a message size threshold and a message sending rate threshold, detecting the opening of Simple Mail Transfer Protocol, SMTP connections between a client device and an email server, identifying messages sent from the client over the SMTP connections which exceed said message size threshold and counting the identified messages to determine a client email message sending rate. The method further comprises making an assumption that the client is engaged in the sending of spam emails if the client message sending rate exceeds said message sending rate threshold.

The network node may be one of a VPN gateway, a router, a passive network monitoring system, a passive network monitoring sensor, and a firewall. The client can be one of the client device, an application installed on the client device, or a user account associated with the client device or with the application.

The method may further comprise, in response to making the assumption that the client is engaged in sending spam emails, automatically blocking one or more SMTP ports to prevent the client from sending further email messages, and or sending a warning to the client.

The messages sent from the client over the SMTP connections may comprise commands and one or more message envelopes, and the step of defining a message size threshold may comprise defining a message size between a minimum message envelope size and a maximum command size. The message size threshold may be 2 kB, or may be dynamically updated.

The method may further comprise measuring the size of RCPT TO commands or counting the number of RCPT TO commands sent from the client. One or more of said SMTP connections may be Transport Layer Security, TLS, encrypted.

According to a second aspect of the invention there is provided a system for determining that a client is likely engaged in the sending of spam emails via a network node. The system comprises the network node, which is configured to define a message size threshold and a message sending rate threshold, detect the opening of Simple Mail Transfer Protocol, SMTP connections between a client device and an email server, identify messages sent from the client over the SMTP connections which exceed said message size threshold and count the identified messages to determine a client email message sending rate. The network node is further configured to make an assumption that the client is engaged in the sending of spam emails if the client message sending rate exceeds said message sending rate threshold.

The network node may be one of a VPN gateway, a router, a passive network monitoring system, a passive network monitoring sensor, and a firewall. The client can be one of the client device, an application installed on the client device, or a user account associated with the client device or with the application.

The network node may be further configured to, in response to making the assumption that the client system is engaged in the sending of spam emails, automatically block one or more SMTP ports to prevent the client from sending further email messages, and/or to send a warning to the client.

The messages sent from the client over the SMTP connections may comprise commands and one or more message envelopes, and the network node may be configured to define the message size threshold between a minimum message envelope size and a maximum command size. The message size threshold can be 2 kB, or the network node may be configured to dynamically set the size threshold.

The network node may be further configured to measure the size of RCPT TO commands or to count the number of RCPT TO commands sent from the client. One or more of the SMTP connections may be Transport Layer Security, TLS, encrypted.

The network node may comprise comprise one or more processors configured to define the message size threshold and the rate of email messages sent from the client and to determine if the rate of email messages sent from the client exceeds the rate threshold.

The network node may comprise a counter configured to identify the messages that exceed the size threshold and to count the number of identified messages.

The term "client" is used in a broad sense and may refer to a computing device (e.g. a smartphone or laptop) or to an application on such a device or to a user account accessed via a device/application.

DETAILED DESCRIPTION

Figure 1:
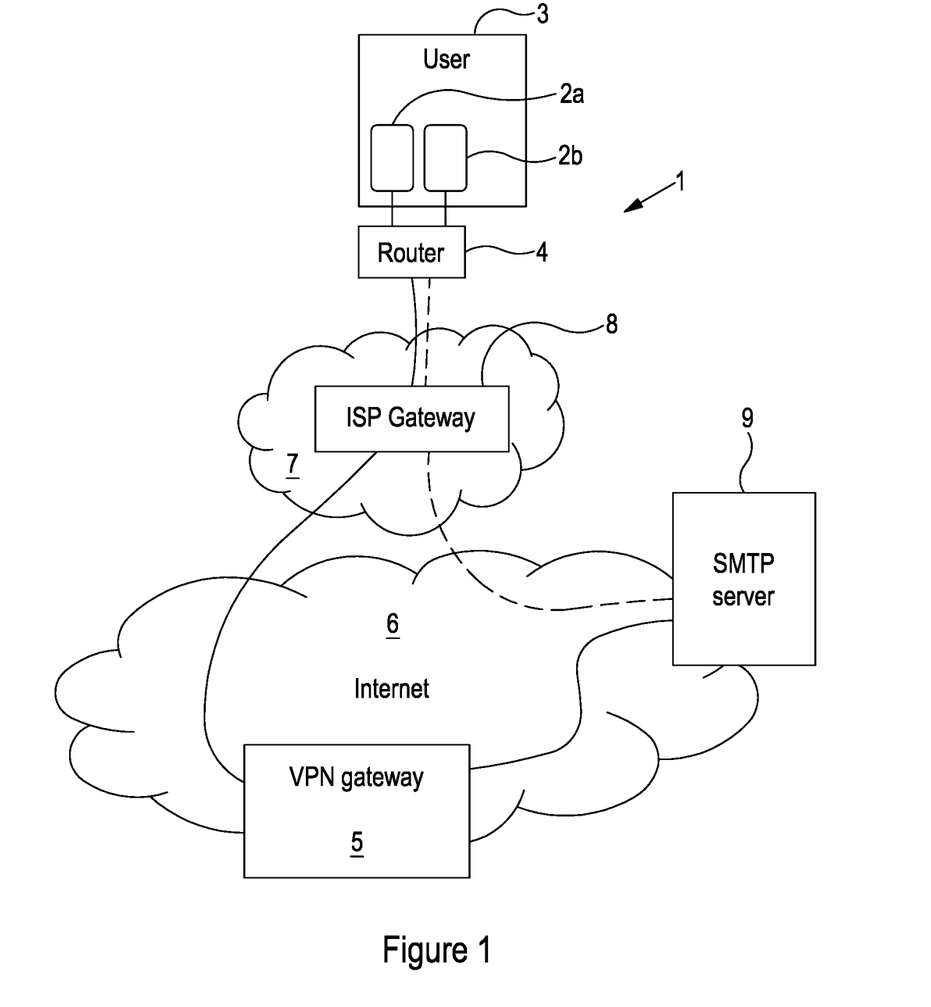
FIG. 1 is a schematic network diagram comprising a system according to an embodiment.

FIG. 1 illustrates schematically a network 1 in which a user computing device 2a and 2b (e.g. a smartphone or laptop) may be engaged in the sending of spam emails. The devices 2a and 2b are controlled by a user 3. For simplicity, only one user 3 with two devices 2a and 2b is shown, but the network may in general comprise any number of users and computing devices. The computing devices 2a and 2b connect to a local router 4 (e.g. CPE routers, DSL, cable modem etc.). The devices 2a and 2b may use a VPN internet access service to anonymously access internet services (e.g. email services) via a VPN gateway 5. The devices 2a and 2b can securely connect to the VPN over the internet 6. The VPN gateway 5 authenticates devices 2a and 2b using cryptographic authentication methods available in the VPN protocol (e.g. using client certificates and digital signatures). The VPN gateway 5 can identify devices 2a and 2b by device identifiers obtained during the authentication process. In one example, the VPN gateway identifies devices 2a and 2b by a device identifier embedded in a client certificate during the authentication phase at the beginning of the VPN session. The device identifier may be a random Universal Unique Identifier (UUID) generated by the backend system of the VPN service during client provisioning. Each VPN session between a device 2a and 2b and the VPN can be identified by a session identifier. Each VPN packet transmitted during the VPN session can be signed and authenticated cryptographically using session-specific keys, which are negotiated at the beginning of the session (and regularly renegotiated during longer sessions). The local router 4 routes traffic to and from the devices 2a and 2b and accesses the internet 6 via the ISP's internet access network 7 and an ISP gateway 8.

The VPN gateway 5 is configured to detect the opening of SMTP connections between the devices 2a and 2b and an SMTP email server 9, and to implement a counter for counting the number of SMTP email messages from the devices 2a and 2b on one or more SMTP ports (typically port 25, 435 and/or 587). The VPN gateway 5 may count the number of emails sent per device 2a and 2b or per VPN session or both. The user 3 may connect to the VPN with a device 2a and 2b, and later reconnect the same device 2a and 2b, thereby starting a new VPN session. In an embodiment, the VPN gateway 5 sums the number of emails sent over different VPN sessions by the same device 2a and 2b in order to calculate the total number of emails sent by a specific device 2a and 2b.

Multiple SMTP email messages may be sent within a single SMTP/TLS connection, which normally prevents the counting of emails as the email message envelope/body cannot be distinguished from other messages sent from a device, for example, as part of the connection setup. SMTP is a turn-based protocol, in which the device sends commands, the receiving server sends replies, and the device sends more commands followed by the message envelope. Because the message envelope is sent as a relatively large outgoing stream preceded and followed by smaller commands, the number of submitted emails in a single connection can be counted by analysing the sizes of messages, without having to parse the stream. For example, a static size threshold can be used to distinguish the submitted message envelopes from the commands sent by the device. TLS makes the sizes slightly larger but does not prevent analysis.

In order to count the number of outbound emails on an SMTP port, the VPN gateway 5 is configured to define a message size threshold. The message size threshold is used at the VPN gateway 5 to identify messages sent from the devices 2a and 2b that have a size which exceeds the threshold, and the gateway 5 can then count the number of such identified messages. If an appropriate message size threshold is used, then the number of identified messages is equal to, or at least approximately equal to, the number of emails. Hence, embodiments of the VPN gateway 5 enable the number of outgoing SMTP emails on the SMTP ports to be counted even in the presence of TLS encryption. The counting at the VPN gateway 5 can be performed passively, without decrypting TLS or performing a Man in the Middle (MITM) attack. From the number of messages counted, the gateway 5 determines the rate of emails sent from the devices 2a and 2b (e.g. the number of emails per day). The VPN gateway 5 then compares this sending rate to a rate threshold, and if the sending rate of one of the devices 2a and 2b exceeds the threshold it is determined that that device 2a and 2b is likely or potentially engaged in sending spam emails.

Upon determining that a device 2a and 2b is likely engaged in the sending of spam emails, the VPN gateway 5 may notify the user 3 using a push notification sent to the device 2a or 2b. The notification may be sent to an app on the device, which displays it to the user 3. The VPN gateway 5 can also be used to implement automatic suppression of outgoing emails from a suspected spammer, by blocking the SMTP ports for the device 2a and 2b. For example, a device 2a and 2b may be allowed to send 100 emails per day, after which the SMTP ports would be blocked for that device 2a and 2b.

A single SMTP email message may be sent to multiple recipients with a single SMTP transaction. In this case, it is not possible to reliably count the number of recipients when TLS is used. However, most SMTP servers limit the number of recipients per envelope, forcing a spammer to send a large number of email message envelopes.

In an alternative embodiment, the VPN gateway 5 is able to identify the user 3 accessing the VPN and to count the number of emails sent by the user 3. For example, the user 3 may have registered a user account with the VPN service and logged-in to access the VPN. Using this approach the VPN gateway 5 may be able to identify the user 3 regardless of which device 2a and 2b is being used. In such a case, the rate threshold can be applied to the user 3 rather than to an individual device 2a and 2b. So that if the combined message rate of all devices 2a and 2b used by the same user 3 exceeds the rate threshold, then the user 3 can be informed and/or blocked.

In other embodiments the counting and spam detection is performed at a different network node other than the VPN gateway 5. The user 3 can access the internet 6 and the SMTP server 9 directly via the internet access network 7 and the ISP gateway 8, as shown by the dashed line in FIG. 1. In this case, the method of counting may be implemented at the ISP gateway 8. The ISP gateway 8 can detect when one of the devices 2a and 2b sets up an SMTP connection with the SMTP server 9. The router 4 may provide Network Address Translation ("NATing") to map private/local IP addresses of the devices 2a and 2b to a public/global IP address. NATing performed at the router 4 will hide multiple devices behind a single IP address. The ISP Gateway 8 may therefore, unlike the VPN gateway 5, not be able to identify the specific device 2a and 2b; NAT hides the device identity (such as the MAC address) from the operator's systems and logging. The ISP gateway 8 may then only be able to identify the router 4 and the ISP account holder associated with that router 4. It may therefore be preferable to implement the method directly in the local router 4, i.e. at the NAT device.

In FIG. 1, the user 3 uses two devices 2a and 2b, which connect to the local router 4. Each of the two devices 2a and 2b may be assigned a different private IP address, with which they can be identified by the router 4. Unlike the ISP gateway 8, because the router 4 is able to identify the devices 2a and 2b, the router 4 is able to determine the specific device 2a and 2b that is connecting to the SMTP server 9. If one of the devices 2a and 2b is engaged in sending spam emails, then the router 4 can take suitable action to block that particular device from sending further emails. The router 4 may also warn the user 3 of potential malware on that device 2a and 2b.

Figure 2:
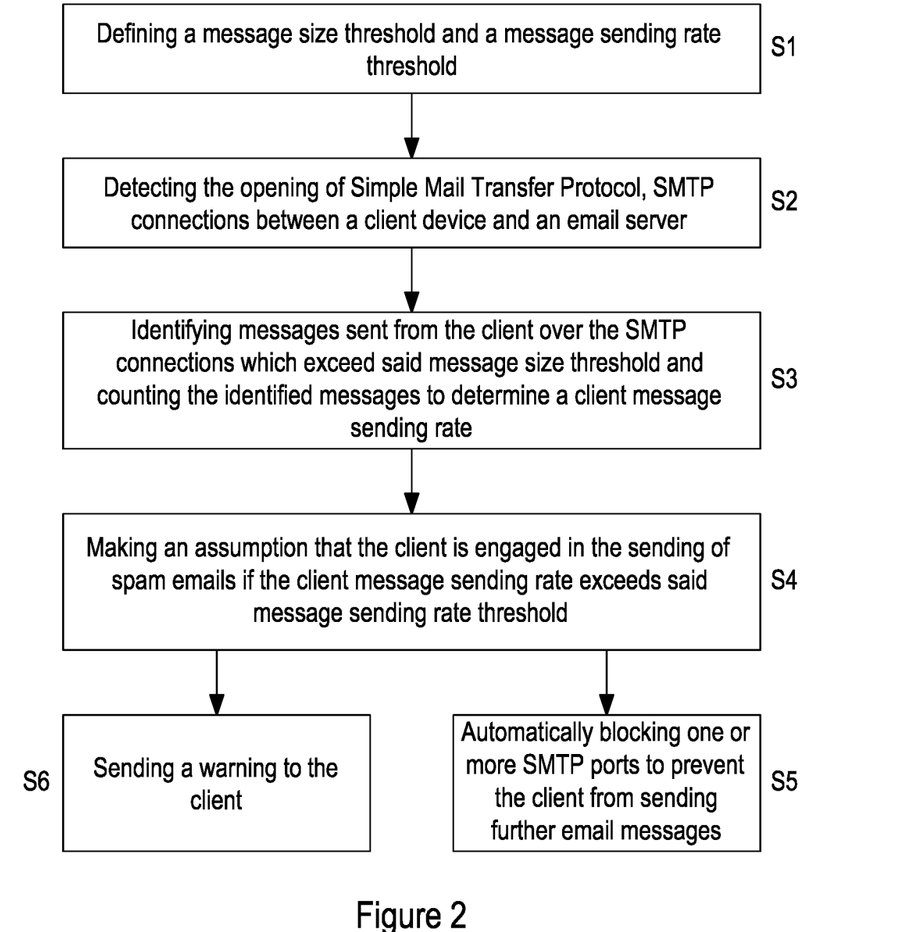
FIG. 2 is a flow diagram illustrating the steps of a method of determining a rate of emails sent from a client according to an embodiment.

FIG. 2 is a flow diagram illustrating the steps of a method performed at a network node of determining if a client is likely engaged in sending spam emails and of taking action accordingly. The method comprises defining a message size threshold and a message sending rate threshold (step S1); detecting the opening of SMTP connections between a client device and an email server (step S2); identifying messages sent from the client over the SMTP connections which exceed said message size threshold and counting the identified messages to determine a client message sending rate (step S3); and making an assumption that the client is engaged in the sending of spam emails if the client message sending rate exceeds said message sending rate threshold (step S4). The method further comprises, in response to making the assumption that the client is sending spam emails, automatically blocking one or more SMTP ports (typically ports 465 and/or 587) to prevent the client from sending further email messages (step S5) and/or sending a warning to the client (step S6). The identified client may be the client device connecting to the SMTP server, an application on that device (e.g. a VPN client), or a user account associated with that device or application (e.g. the VPN account holder). The network node may be the VPN gateway or the router, or may be a firewall, or a passive network monitoring sensor or system (e.g. a traffic analyser).

Minimal dissection of TLS records can be performed in order to differentiate between TLS handshake/control messages and TLS "application data" messages containing the SMTP stream (i.e. the commands and the message envelope). The TLS handshake messages are the TLS's own control messages used to negotiate encryption algorithms, parameters and keys, and to authenticate the server using a certificate to prevent MITM attacks. Differentiating between the TLS control messages and the TLS application data messages allows a more accurate counting of SMTP commands as only the application data messages need to be analysed. The number of commands can be used for heuristics and spammer client detection, as they often end up issuing many commands to an SMTP server, only to find out that the server will not accept a message due to a DNS-based blocking list (a.k.a. Real-time Blackhole List, RBL). In the beginning of a connection on port 465 there will be a number of TLS handshake messages before the SMTP conversation begins. These can be ignored in the heuristics. A connection on port 587 will begin with an SMTP handshake, and the client device will issue a STARTTLS command to tell the server that a TLS handshake should be initiated within the same TCP connection.

Figure 3:
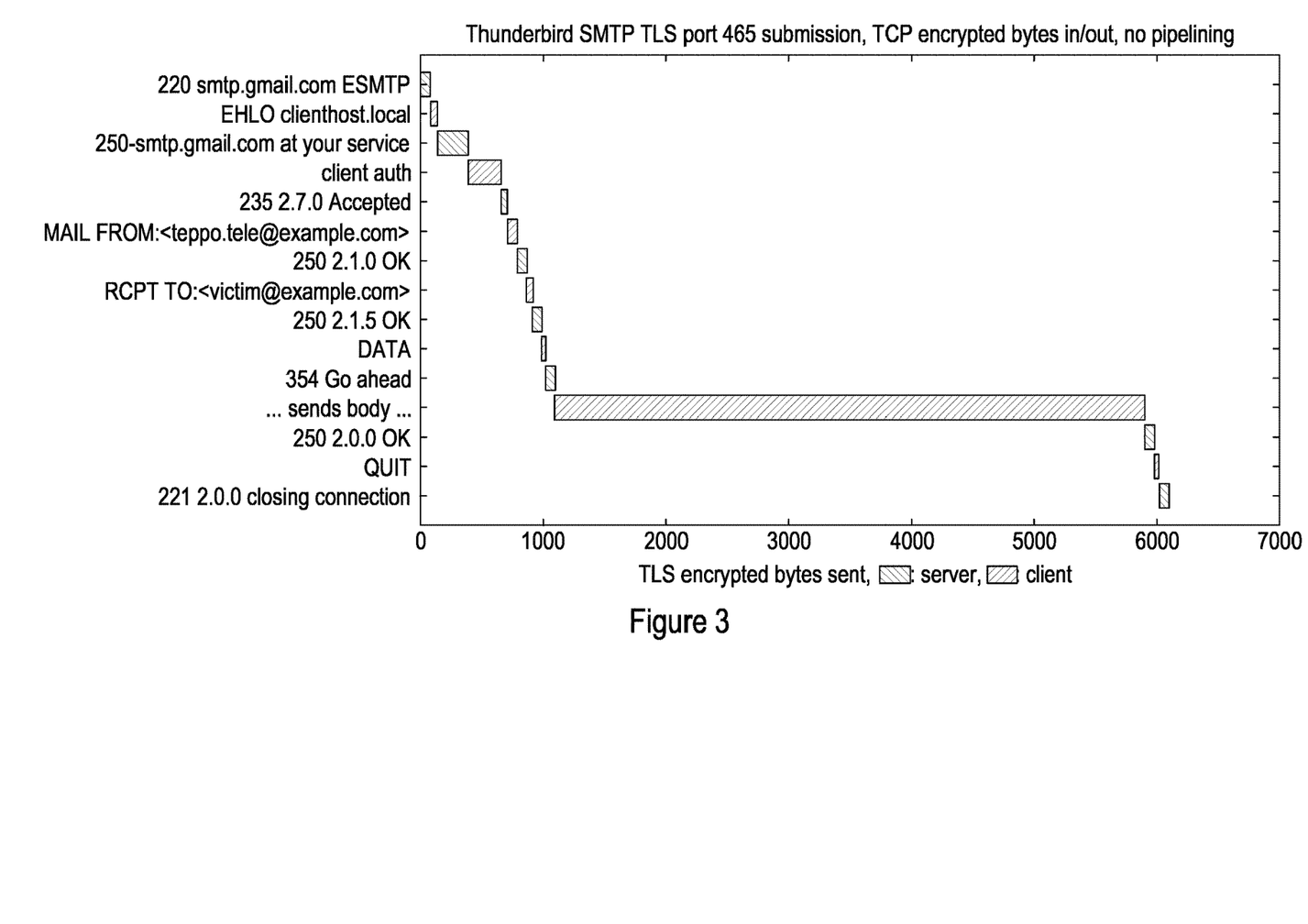
FIG. 3 is a graph showing data transmission type plotted against data transmission size for an SMTP connection.

A normal SMTP submission from Mozilla Thunderbird to Gmail using TLS encryption may look as follows:

```
SMTP Connecting to: smtp.gmail.com:465
<- 220 smtp.gmail.com ESMTP a9x23krhai3fi.123 - gsmtp
-> EHLO clienthostname.local
<- 250-smtp.gmail.com at your service, [192.0.2.33]
<- 250-SIZE 35882577
<- 250-8BITMIME
<- 250-AUTH LOGIN PLAIN XOAUTH2 PLAIN-CLIENTTOKEN
OAUTHBEARER XOAUTH
<- 250-ENHANCEDSTATUSCODES
<- 250-PIPELINING
<- 250-CHUNKING
<- 250 SMTPUTF8
trying auth method 0x10000
Logging suppressed for this command (it probably contained
authenticate information)
<- 235 2.7.0 Accepted
-> MAIL FROM:<teppo.tele@example.com> BODY=8BITMIME
SIZE=4778
<- 250 2.1.0 OK a9x23krhai3fi.123 - gsmtp
-> RCPT TO:<victim@example.com>
<- 250 2.1.5 OK a9x23krhai3fi.123 - gsmtp
-> DATA
<- 354 Go ahead a9x23krhai3fi.123 - gsmtp
... sends data ...
-> .
<- 250 2.0.0 OK 1542186767 a9x23krhai3fi.123 - gsmtp
-> QUIT
<- 221 2.0.0 closing connection a9x23krhai3fi.123 - gsmtp
```

The above conversation was logged by Thunderbird, and a packet capture of the TLS encrypted connection was analysed.

FIG. 3 shows the type of message plotted against the size (i.e. the number of bytes) of the TLS encrypted data of the SMTP connection. In this case, PIPELINING was not implemented by the Thunderbird client to bundle commands. The submission of the 4778-byte message envelope from Teppo Tele to Victim is clearly visible, and it is not greatly inflated by TLS. The number of large message bodies in the connection can be counted to determine the number of outgoing emails.

Figure 4:
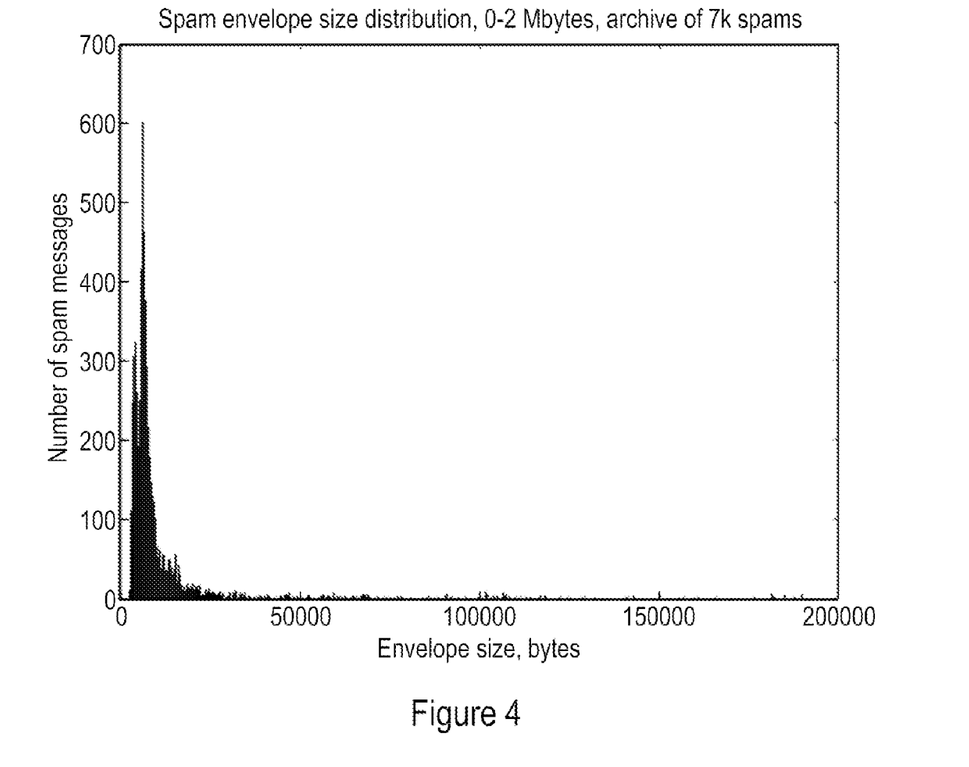
FIG. 4 is a histogram of the size of spam email messages.
Figure 5:
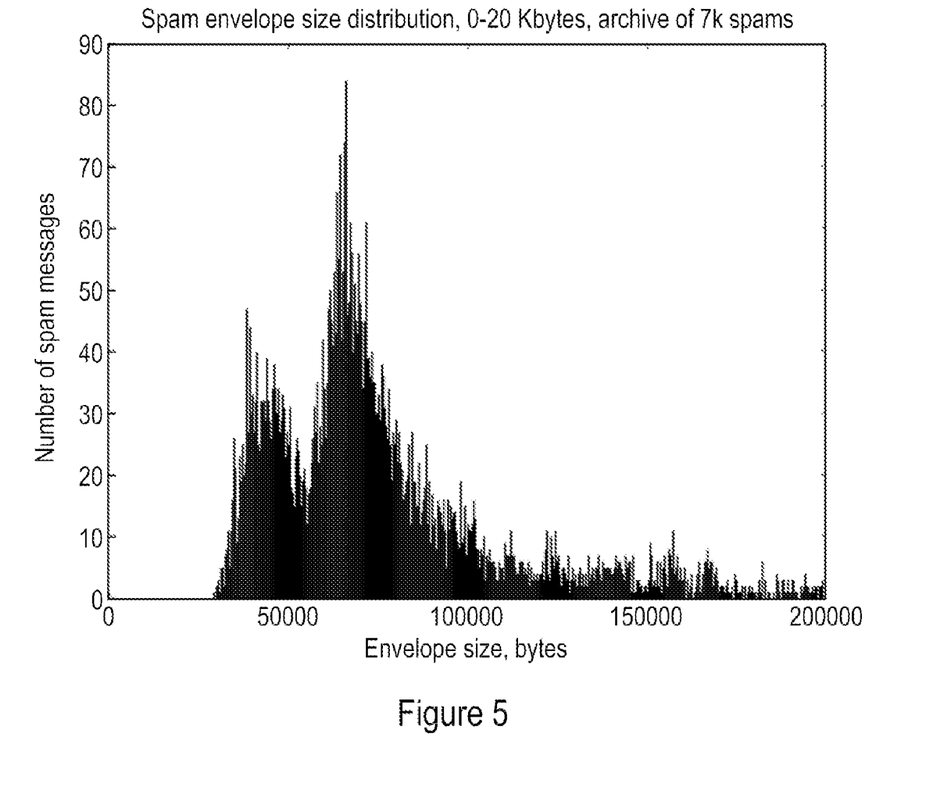
FIG. 5 is an expanded view of the histogram of FIG. 4.

To obtain a threshold for the minimum envelope size, a histogram of spam message size distribution was plotted. FIG. 4 shows the plotted histogram and FIG. 5 shows a zoomed in part of the histogram. About seven thousand spam messages were included in the analysis. As can be seen from FIGS. 4 and 5, there were no spam emails below 2 kilobytes. It can be assumed that the commands are below 2 kilobytes, which could therefore be used as a threshold to distinguish the submitted message envelope/body from commands. Further statistical analysis may be used to fine tune the message size threshold in order to more accurately identify message envelopes in an SMTP stream. A machine learning algorithm may be used to dynamically update the threshold, which can then be sent to the network node.

Figure 6:
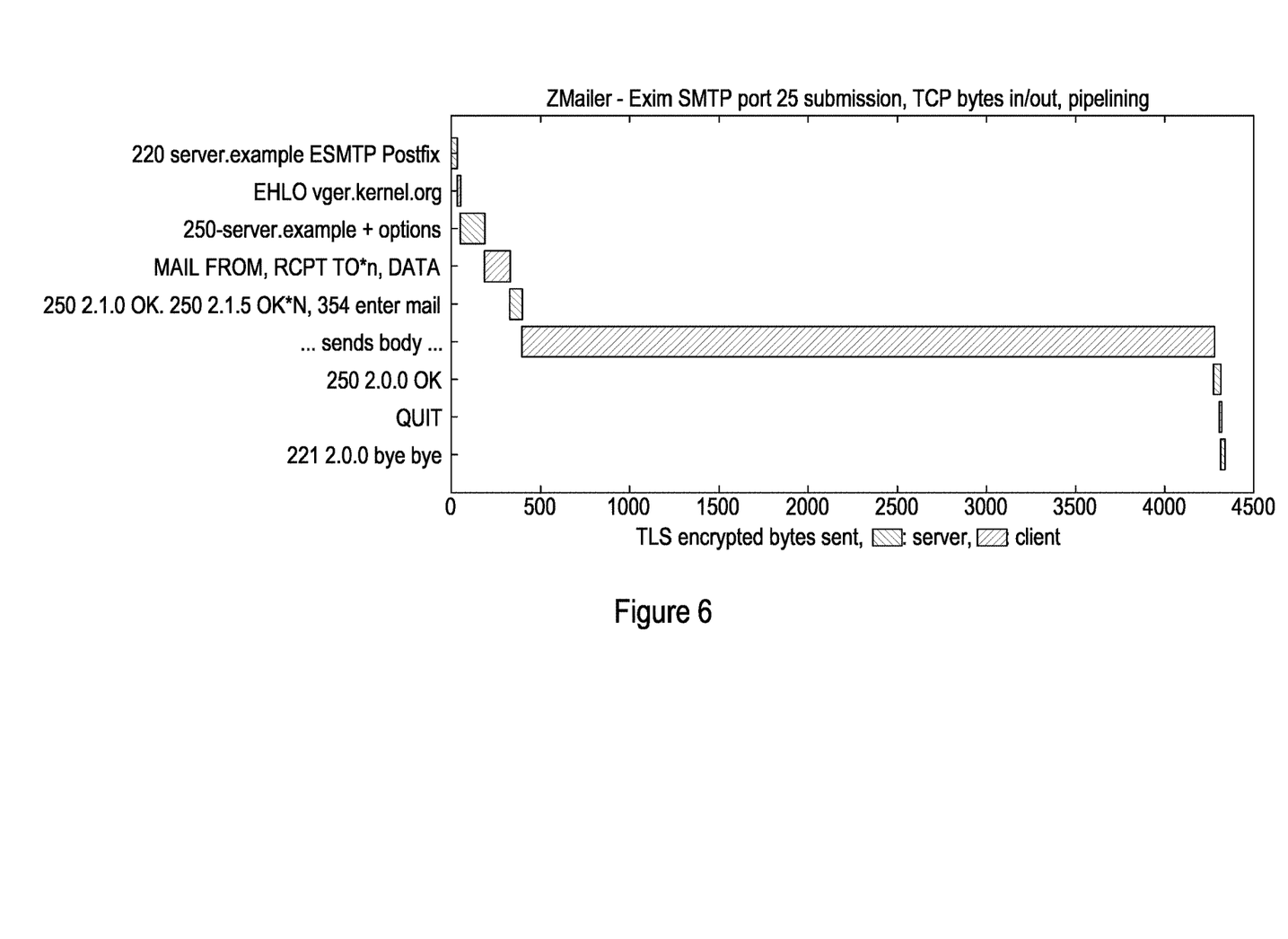
FIG. 6 is a graph showing data transmission type plotted against data transmission size for a SMTP connection without TLS encryption.

FIG. 6 shows a pipelined single-recipient submission from ZMailer to Exim, without TLS encryption. When PIPELINING is implemented, the client may send multiple commands (MAIL FROM, RCPT TO for each recipient, and DATA) without waiting for a reply from the server. It should, however, wait for all the replies, and in particular, the "354 you may now send the data" reply for the DATA command, before transmitting the message envelope. With more recipients, a pipelined submission will have a larger RCPT TO data transmission. While TLS will make it non-obvious which packets contain the RCPT TO commands, in case of PIPELINING there will be a larger command transmission before the message envelope, and respectively, there will be a smaller number of separate commands and replies sent. A very large command transmission can be used as an indication of a very large number of recipient addresses for a single envelope, which could also be used as an indicator of spamming. The exact number of recipients cannot be counted from the size of the RCPT TO command, as the size of individual email addresses vary (a long email address can have the same size as two short email addresses). A non-pipelined submission, on the other hand, has more command-reply round-trips as each recipient will be separately acknowledged by the SMTP server. In the case of a non-pipelined submission, the number of message recipients can be roughly estimated by counting the number of commands and responses.

A very large pipelined command section (e.g. RCPT TO) with a large number of recipients and TLS encryption, may accidentally be counted as a separate message envelope. However, such a large command section will generally be preceded by fewer commands than an actual message envelope, and can be discounted on this basis. That is, in an embodiment, the network node counts the number of commands before a message identified as having a size exceeding the message size threshold, and if the number of commands immediately preceding said message is below a predetermined minimum number then the message is not counted. In other embodiments, the large command sections (exceeding the message size threshold) are included and cause the determined rate to reach the rate threshold more rapidly.

Figure 7:
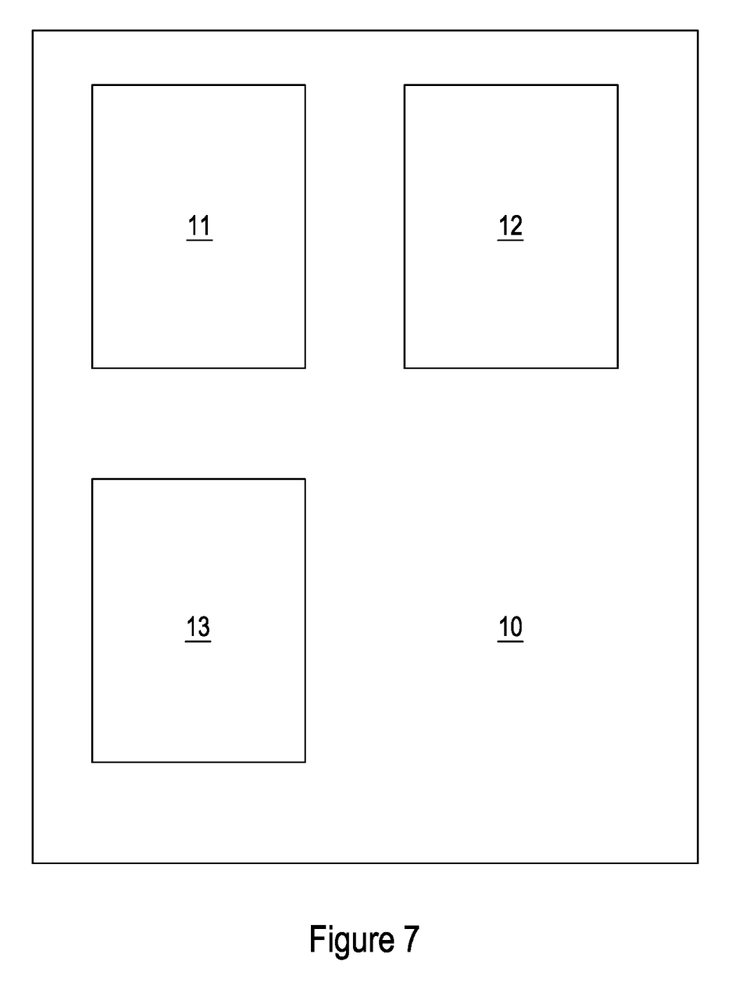

FIG. 7 shows a schematic diagram of a network node 10, such as a VPN gateway or a router, according to an embodiment. The network node 10 comprises a processor 11 configured to define the message size threshold and the message sending rate threshold, and to determine when the client email message sending rate exceeds said rate threshold. The network node 10 also comprises a counter 12 for counting the number of messages sent from a client that exceed said message size threshold. The network node 10 may also comprise a memory for storing information, such as the message size threshold and message sending rate threshold.

Although specific embodiments have been described above, the skilled person will understand that other embodiments that fall within the scope of the claims can readily be made. For example, detection of high email rates (suspected spam) may also be useful for routers such as the SENSE™ router by F-Secure™, Helsinki, Finland. Embodiments of the invention may also be combined with intrusion detection and response services, such as the Rapid Detection and Response Service (RDS) by F-Secure™, Helsinki, Finland. For example, the method may be implemented in the passive network monitoring system/sensor of the RDS.

The invention claimed is:

1. A method of determining that a client is likely engaged in the sending of spam emails via a network node, the method comprising, at the network node:

defining a message size threshold and a message sending rate threshold, wherein defining the message size threshold comprises defining a message size between a minimum message envelope size and a maximum command size;

detecting opening of Simple Mail Transfer Protocol, SMTP, connections between a client device and an email server;

identifying messages sent from the client over the SMTP connections which exceed said message size threshold and counting the identified messages to determine a client email message sending rate, wherein the messages sent from the client over the SMTP connections comprise commands and one or more message envelopes; and making an assumption that the client is engaged in the sending of spam emails if the client email message sending rate exceeds said message sending rate threshold.

2. A method according to claim 1, wherein the network node is one of a VPN gateway, a router, a passive network monitoring system, a passive network monitoring sensor, and a firewall.

3. A method according to claim 1, wherein the client is one of the client device, an application installed on the client device, or a user account associated with the client device or with the application.

4. A method according to claim 1, comprising, in response to making the assumption that the client is engaged in sending spam emails, automatically blocking one or more SMTP ports to prevent the client from sending further email messages.

5. A method according to claim 1, comprising, in response to making the assumption that the client is engaged in sending spam emails, sending a warning to the client.

6. A method according to claim 1, wherein the message size threshold is 2 kB.

7. A method according to claim 1, wherein the message size threshold is dynamically updated.

8. A method according to claim 1, comprising measuring a size of RCPT TO commands or counting a number of RCPT TO commands sent from the client.

9. A method according to claim 1, wherein one or more of said SMTP connections are Transport Layer Security, TLS, encrypted.

10. A system for determining that a client is likely engaged in the sending of spam emails via at least one network node device, the system comprising the at least one network node device configured to:
 define a message size threshold and a message sending rate threshold, wherein the at least one network node device is configured to define the message size threshold between a minimum message envelope size and a maximum command size;
 detect opening of Simple Mail Transfer Protocol, SMTP, connections between a client device and an email server;
 identify messages sent from the client over the SMTP connections which exceed said message size threshold and count the identified messages to determine a client email message sending rate, wherein the messages sent from the client over the SMTP connections comprise commands and one or more message envelopes; and
 make an assumption that the client is engaged in the sending of spam emails if the client email message sending rate exceeds said message sending rate threshold.

11. A system according to claim 10, wherein the at least one network node device is one of a VPN gateway, a router, a passive network monitoring system, a passive network monitoring sensor, and a device implementing a firewall.

12. A method according to claim 10, where the client is one of the client device, an application installed on the client device, or a user account associated with the client device or with the application.

13. A system according to claim 10, wherein the at least one network node device is further configured to, in response to making the assumption that the client is engaged in the sending of spam emails, automatically block one or more SMTP ports to prevent the client from sending further email messages.

14. A system according to claim 10, wherein the at least one network node device is further configured to, in response to making the assumption that the client is engaged in the sending of spam emails, send a warning to the client.

15. A system according to claim 10, wherein the message size threshold is 2 kB.

16. A system according to claim 10, wherein the at least one network node device is further configured to measure a size of RCPT TO commands or to count a number of RCPT TO commands sent from the client.

17. A system according to claim 10, wherein, one or more of the SMTP connections are Transport Layer Security, TLS, encrypted.

18. A system according to claim 10, wherein the at least one network node device comprises one or more processors configured to define the message size threshold and a rate of email messages sent from the client and to determine if the rate of email messages sent from the client exceeds the message sending rate threshold; or
 wherein the at least one network node device comprises a counter configured to identify the messages that exceed the size threshold and to count a number of identified messages.

19. A system for determining that a client is likely engaged in the sending of spam emails via a system implemented by at least one network device, the system configured to:
 define a message size threshold and a message sending rate threshold, wherein the system is configured to define the message size threshold between a minimum message envelope size and a maximum command size;
 detect opening of Simple Mail Transfer Protocol, SMTP, connections between a client device and an email server;
 identify messages sent from the client over the SMTP connections which exceed said message size threshold and count the identified messages to determine a client email message sending rate; and
 make an assumption that the client is engaged in the sending of spam emails if the client email message sending rate exceeds said message sending rate threshold.

20. The system of claim 19, wherein the at least one network device comprises a VPN gateway, a router, a passive network monitoring system, or a passive network monitoring sensor.

21. The system of claim 19, wherein the system comprises a firewall implemented by the at least one network device.

* * * * *